United States Patent [19]

Strickland et al.

[11] Patent Number: 5,465,215
[45] Date of Patent: Nov. 7, 1995

[54] NUMERICAL CONTROL METHOD AND APPARATUS

[75] Inventors: S. Scott Strickland, Terrace Park; James R. Krietemeyer, Cincinnati; Jing Liao; Ian D. Mead, both of West Chester; Robert L. Puckett, Cincinnati, all of Ohio

[73] Assignee: Cincinnati Milacron Inc., Cincinnati, Ohio

[21] Appl. No.: 271,933

[22] Filed: Jul. 7, 1994

[51] Int. Cl.$^6$ ............................. G06F 15/00; G05B 19/04
[52] U.S. Cl. .................. 364/474.22; 364/188; 364/189; 364/191; 364/192
[58] Field of Search ........................ 364/188, 189, 364/191, 192, 474.22, 474.27, 140, 146; 395/159, 161

[56] References Cited

U.S. PATENT DOCUMENTS

| | | | |
|---|---|---|---|
| 4,519,026 | 5/1985 | Nozawa et al. | 364/167 |
| 4,530,046 | 7/1985 | Munckata et al. | 364/191 |
| 4,542,414 | 6/1985 | Kiyokawa | 364/474.22 |
| 4,607,327 | 8/1986 | Kishi et al. | 364/191 |
| 4,636,938 | 1/1987 | Broome | 364/191 |
| 4,706,002 | 11/1987 | Fujiyama | 318/568 |
| 4,788,636 | 11/1988 | Shiratori et al. | 364/191 |
| 4,978,901 | 12/1990 | Hirai | 318/600 |
| 5,122,717 | 6/1992 | Hayashi | 318/569 |
| 5,168,441 | 12/1992 | Onarheim et al. | 364/146 |
| 5,177,690 | 1/1993 | Seki et al. | 364/474.27 |
| 5,287,449 | 2/1994 | Kojima | 395/161 |
| 5,301,301 | 4/1994 | Kodosky et al. | 395/500 |
| 5,355,307 | 10/1994 | Scharnhorst | 364/188 |
| 5,392,207 | 2/1995 | Wilson et al. | 364/167.01 |

Primary Examiner—Paul P. Gordon
Attorney, Agent, or Firm—John W. Gregg

[57] ABSTRACT

A manual data input facility of a machine control includes graphically assisted input. An MDI main display and lead-through graphic displays are generated to facilitate selection of functions and entry of associated data. The displays make use of graphic icons and text recognizable by an operator. Input devices advantageously include a contact actuated touch screen and numeric keypad. A graphic assisted MDI mode of operation generates instruction blocks conforming to a predetermined user programming convention in response to operator selections and numeric data input. The operator initiates execution of instruction blocks so generated, one block at a time, by operation of a Cycle Start input.

20 Claims, 4 Drawing Sheets

NUMERICAL CONTROL METHOD AND APPARATUS

BACKGROUND OF THE INVENTION

I. Field of the Invention

This invention relates generally to numerical control of machines. In particular this invention relates to manual data input (MDI) for numerical controls.

II. Description of Related Art

MDI is a control feature that permits an operator to initiate execution of functions defined by manually entered data by, for example, actuation of a Cycle Start push button. Conventional MDI operation executes one "block" of information for each cycle initiation, and hence performs a single function for each cycle initiation. Manual entry of data for MDI in known controls requires entry of program codes and parameter data conforming to a programming standard supported by the control and as adapted for the particular machine application. For example, predefined cycles for drilling must be identified by a predetermined program code such as "G81". This requirement that program code be entered for MDI operation poses a hurdle for control operators who are not familiar with all the applicable programming conventions. As programming capability have been expanded on machine controls, facilities for program creation providing graphic displays and computational aids have been added. However, these facilities in known controls require the user to completely specify all data required by the programming system and store the generated program for execution in a fully automatic mode of operation of the control. Hence, these graphic programming aids are not available for known controls for MDI operation.

SUMMARY OF THE INVENTION

It is an object of the present invention to provide machine control manual data input facilities having a graphic lead-through data input facility.

It is a further object of the present invention to provide machine control manual data input facilities having a graphic lead-through data input facility wherein user selections and data entered manually comprise a program instruction block available for execution while manual data input is enabled.

It is a further object of the present invention to provide machine control manual data input facilities having a graphic lead-through data input facility wherein a list of processes corresponding to program instruction blocks may be stored for execution in fully automatic operation of the control.

Further objects and advantages of the inventions shall become apparent from the drawings and the accompanying description thereof.

A control having a touch-screen display is provided with a manual data input mode of operation wherein displays are provided to lead an operator through selection of desired functions and entry of required parameter data. A main MDI display comprises graphic icons associated with functions available for selection. For each function selectable from a main MDI display, additional graphic displays facilitate entry of parameter data required for execution of a selected function.

DETAILED DESCRIPTION OF THE PREFERRED EMBODIMENT

To illustrate the invention, a computer numerical control (CNC) developed for Cincinnati Milacron Inc., the assignee of the present invention, and a graphically assisted manual data input facility implemented using the CNC shall be described in detail.

Computer Numerical Control

Figure 1:
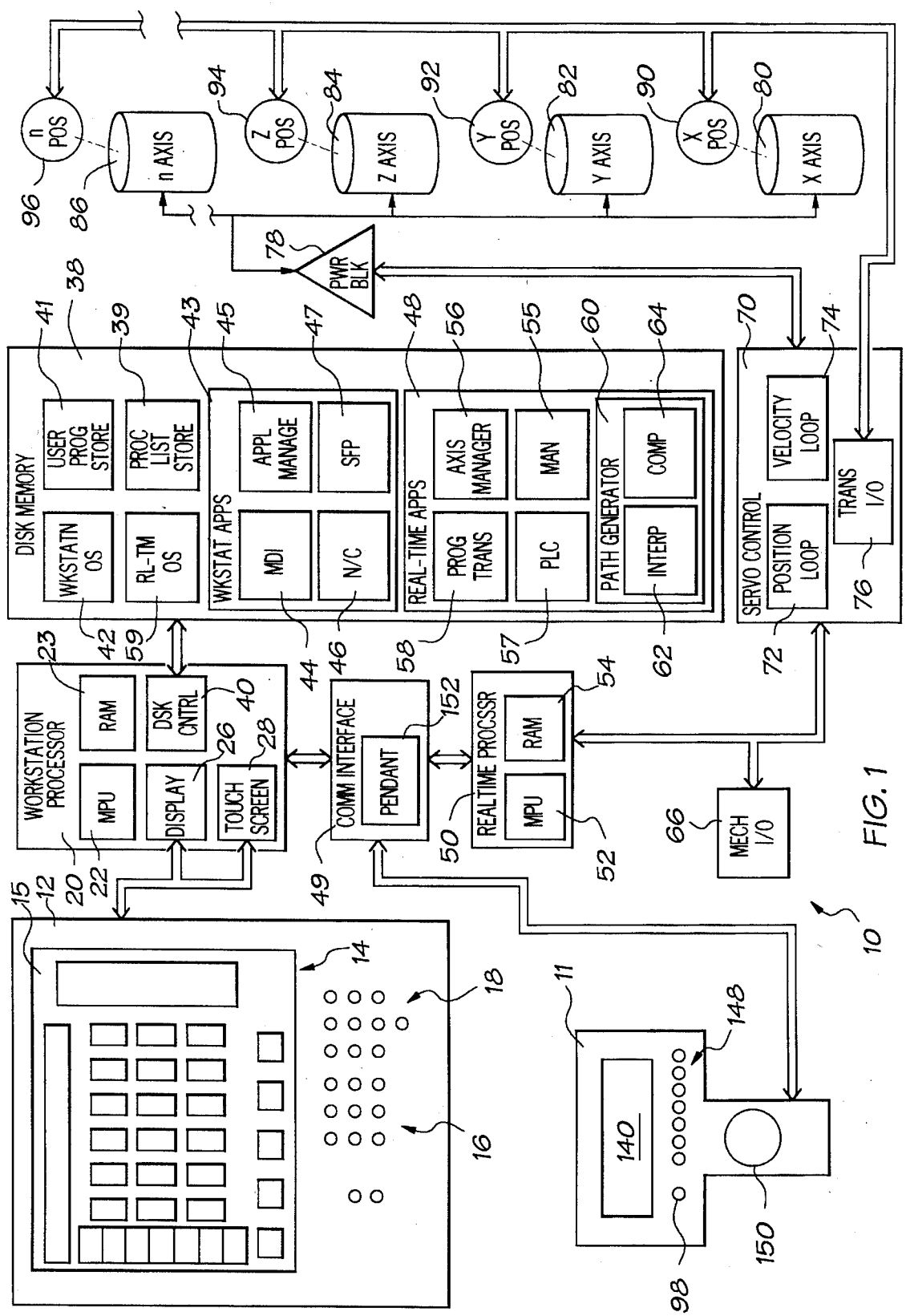
FIG. 1 is a block diagram of a control according to the invention.

Referring to FIG. 1, CNC 10 includes an operator station 12, an operator pendant 11, a workstation processor 20, a real-time processor 50, a mechanism interface 66 and a servo control 70. CNC 10 effects control over machine mechanisms including servo controlled actuators such as motors 80–86 in response to user input. Operation of CNC 10 is program controlled, various layers of control being effected in response to various layers of programs. Fundamental control of execution of programs is achieved with operating system environment programs. Application programs executed under control of the operating system environment programs define functioning of facilities of CNC 10, for example, functioning of workstation processor 20 and real-time processor 50. Mechanism control programs created according to the structure and operation of machine mechanisms control functioning of machine devices. User programs created according to a programming standard such as, for example, EIA RS 274, are executed under control of application programs to effect operation of machine mechanisms.

Operator pendant 11 includes a display 140, push buttons 148, Cycle Start push button 98 and manual feed control 150. Machine member coordinates, active functions and machine status are displayed on display 140. The pendant permits an operator to manually direct movement of servo controlled machine members and to initiate execution of program controlled machine cycles of operation.

Operator station 12 includes a display device 14 and push buttons 16 including cursor control push buttons used in association with manual entry of data. Display device 14 is preferably fitted with a touch screen 15 having a surface for detecting contact and producing outputs indicating the location of the contact. To facilitate operator selections from display device 14, displays are generated which define contact areas. When contact of touch screen 15 occurs within a defined contact area, a programmed response is initiated. A numeric keypad 18 is provided for numeric data input.

Continuing with reference to FIG. 1, Workstation processor 20, connected to operator station 12, comprises a personal computer processor printed circuit board including a microprocessor 22 and random access memory 23. Programs controlling the operation of operator station 12 are executed by microprocessor 22 from random access memory 23. The processor selected by applicants uses the Intel 486 microprocessor as microprocessor 22; other commercially available processors may be used in the practice of this invention. Workstation processor 20 includes a disk controller 40 for controlling transfer of programs and data to and from disk memory 38. Workstation processor 20 includes program controlled interfaces to effect data input and output including display controller 26 and touch screen and keyboard interface 28. Display controller 26 generates data and control signals for the display device 14 to produce images as required by the operation of CNC 10. Touch screen interface 28 decodes outputs from touch screen 15 to indicate that contact has been made and the location of the contact and decodes outputs from numeric keypad 18 to produce numeric values.

The overall functioning of workstation processor 20 is program controlled, the control programs being stored on disk memory 38. An underlying operating system 42 for the workstation preferably provides a multi-tasking environment for program execution, i.e. allowing application programs to be simultaneously active. Applicant's have chosen the Windows NT® operating system which provides a pre-emptive multi-tasking environment, permitting initiation of execution of any compatible application program during execution of any other application program. Workstation application programs 43 control generation of display data, enable use of touch screen 15 and effect CNC responses to touch screen and keypad inputs. Workstation application programs include: MDI control programs 44 which provide graphically assisted MDI and conventional MDI; application management control programs 45 which control selection of operating modes of CNC 10; automatic N/C programs 46 which control workstation operation in connection with automatic execution of stored user programs; and program generation control programs (SFP) 47 which facilitate creation of user programs.

Continuing with reference to FIG. 1, real-time processor 50 comprises a personal computer processor printed circuit board, preferably including a microprocessor 52 and random access memory 54. Applicants have chosen a processor utilizing an Intel 486 microprocessor; other commercially available processors are suitable for practice of the invention. Programs executed by real time processor 50 are executed by microprocessor 52 from random access memory 54. Real-time processor 50 is program controlled, execution of real time application programs 48 being controlled by a real-time operating system program 59. Real-time operating system programs 59 and real-time application programs 48 are loaded from disk memory 38 to random access memory 54 on initialization of CNC 10, for example, when power is applied.

Real-time application programs 48 include axis management routines 56, programmable logic controller routines 57, program translator routines 58, manual routines 55 and path generator routines 60. Manual routines 55 permit manually directed movement of machine members driven by servo controlled actuators. Such manual operation being controlled by use of pendant 11. Axis management routines 56 permit association of particular aspects of actuator and servo control such as, for example, feedback resolution, range limits, rate limits, acceleration and deceleration rates, and mechanism and servo control compensations with particular mechanism actuators. Programmable logic controller routines 57 control execution of instructions of mechanism control programs. Program translator routines 58 control execution of instructions of user programs conforming to an adopted programming convention. In response to execution of these instructions CNC 10 performs a sequence of operations conforming to the description of the adopted user programming convention. Path generation routines 60 control motion of servo controlled actuators to achieve motion according to a predetermined path definition between present and next commanded positions. Path generation routines 60 include interpolation control routines 62 to determine a path length, resolve the path length into departure distances for the commanded axes, and periodically generate position commands for all affected actuators to achieve controlled operation of the actuator and an associated moveable machine member. Error compensation routines 64 effect compensation of position commands to account for characteristics of the particular machine being controlled. Techniques for implementing the described functions of the real-time operating system programs and of the real-time application programs are well known and such well known techniques are suitable for practice of the present invention.

Mechanism input and output interfaces 66 provide interface circuits between machine mechanisms such as mechanical push buttons, lights, solenoids, relays and limit switches and logic circuitry of CNC 10. Mechanism control programs executed by, programmable logic controller routines 57 define relationships between input and output signals related to such machine devices. The logic control programs typically define a sequence of operation of machine devices to accomplish a machine mechanism function. For example, machines equipped with tool storage devices require operation of the tool storage device and tool exchange mechanisms to retrieve and return tools to and from tool storage. A sequence of operations may be defined to control each mechanism required to effect tool exchanges. Techniques for providing such program control of machine mechanisms and for implementing program controlled execution of such mechanism control programs are well known and known techniques are suitable for practice of the present invention.

Data communication between workstation processor 20 and real-time processor 50 is effected through communication interface 49. Communication interface 49 permits exchanges of data between the data busses of processors 20 and 50. Program transfer of real-time application programs 48 from disk memory 38 to RAM 54 of real-time processor 50 occurs through data communication interface 49. Communication interface 49 contains pendant interface 152 which permits exchange of data with pendant 11, interfacing signals generated by pendant push buttons 148, Cycle Start push button 98 and manual feed control 150 as well as signals output to pendant display 140.

Servo control 70 responds to position commands and feed forward commands to effect servo control of actuators such as motors 80–86. Each servo controlled actuator has an associated position transducer such as transducers 90–96. Preferably these are encoders producing two output signals in quadrature from which position is determined. The transducers are connected with transducer input/output interface circuitry 76. Servo control 70 includes position loop controller 72 which compares position commands with measured position determined from the position transducers to generate velocity commands. Velocity loop controller 74 responds to velocity commands and velocity feed forward commands to produce actuator control signals. The actuator control signals are used to control power delivered to the actuators through power control devices, such as transistors, located at power block 78. Power for the actuators is typically derived from a three phase AC source which is inverted to DC and pulse width modulated by power transistors at power block 78. Servo control 70 may be included as an element of CNC 10 or supplied independently. Alternatively, a position loop controller, such as controller 72, may be included within CNC 10 while a velocity loop controller, such as controller 74, is supplied independently.

MDI Operation

The MDI mode of operation is characterized in that a single operation defined by program instructions is executed for each actuation of a Cycle Start push button such as push button 98 of pendant 11. In the MDI mode, program translation routines 58 control execution of instructions entered manually, the instructions being transferred from workstation processor 20 to real-time processor 50 with operation of Cycle Start push button 98.

A cycle of operation of CNC 10 effected in an MDI mode of operation shall be described with reference to FIG. 2. The cycle of operation begins with actuation of Cycle Start 98. At processing step 100 an in-cycle status signal is set true. While the in-cycle status signal is true, Cycle Start push button 98 will be illuminated. At decision step 102 it is determined whether a cycle command is active which requires generation of position controlled motion. For example, drilling and milling operation commands require precise rate controlled relative movement of a workpiece and tool achieved by servo controlled actuators acting on moveable machine members. Such machine member motions are contrasted to, for example, tool change commands to exchange tools with a tool storage device which are typically achieved by non servo controlled actuators. At process step 104, program translator routines 58 respond to commands not requiring position controlled motion by setting values used by programmable logic controller routines 57 to generate the required control signals for the affected machine mechanisms. Thereafter, the In Cycle signal is reset at process step 106 and the MDI cycle of operation is concluded at terminal 108.

Had a cycle command been active which required position controlled motion, execution from decision step 102 would have continued at decision step 110. There it is determined Whether the active cycle requires execution of any machine function prior to execution of position controlled motion. For example, if a drill cycle is active and spindle commands are programmed, the defined operation may require that the spindle commands be executed immediately and the feed portion of the drill cycle be effected upon completion of execution of the spindle commands. Under those circumstances, execution would proceed at process step 112 where program translator routines 58 respond to spindle commands to set values used by programmable logic controller routines 57 to execute the spindle commands.

Upon completion of execution of functions at process step 112, execution of the cycle of operation continues at process step 114 where position controlled motion is executed. For example, in a drill cycle, position controlled motion may include rapid positioning to locate a drill relative to a workpiece at a position from which a machining motion is to be initiated, position controlled motion at a user specified feedrate to a desired depth, and rapid return to the position from which the user specified feedrate controlled motion was initiated. Each position controlled motion will be effected under control of path generator routines 60 periodically producing position commands for servo control 70. The position controlled cycle may advantageously involve plural machining operations such as, for example, machining of a pattern of holes. Instruction blocks to accomplish such repetitive operation functions are entered sequentially, e.g. a block defining a hole pattern is entered; followed by blocks defining operations to be performed at each hole location; ending with a block cancelling the hole pattern function. All of the plural instruction blocks defining the operation are executed for a single operation of Cycle Start push button 98. Upon completion of a machining operation for a hole, the control automatically repeats the machining operation at locations defined according to the predetermined pattern. Upon completion of position controlled motions, execution of the cycle of operation continues at decision step 116 where it is determined whether any commands are active which require execution of machine mechanism functions upon completion of servo controlled motion. If there are, program translator routines 58 set values for programmable logic controller routines 57 to execute the desired machine mechanism function at process block 104. For example, a spindle stop command may be combined with a drill cycle, causing spindle rotation to be stopped on completion of the drilling operation.

Figure 2:
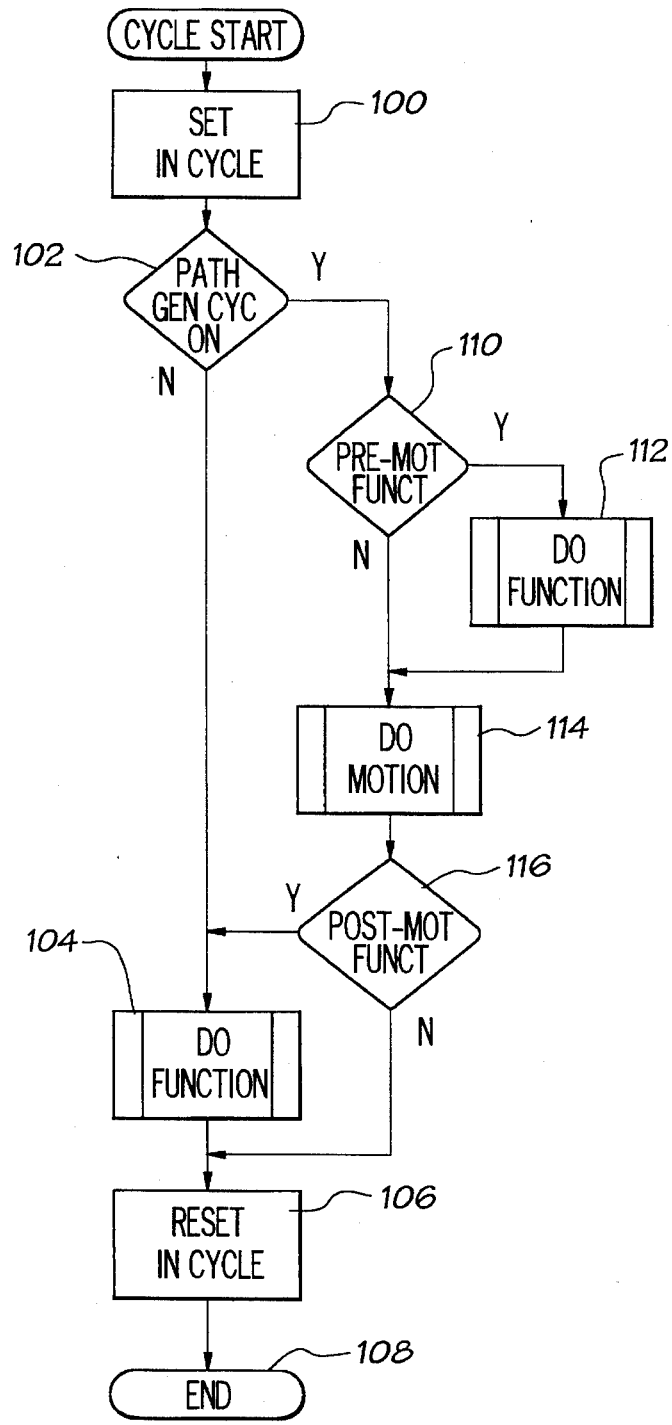
FIG. 2 is a flow chart illustrating a cycle of operation effected by the control of FIG. 1.

It will be appreciated that the flow chart of FIG. 2 is illustrative only of an example of a cycle of operation to be effected in an MDI mode of operation. The MDI mode is distinguished from operation in automatic N/C mode wherein execution of instructions of a user defined program continues in the absence of operator intervention until the first to occur of an end-of-program code or other programmed command which resets the IN CYCLE signal. This difference in operation is effected under control of the program translator routines 58 which control the retrieval and execution of instructions of user program instructions from, for example, user program store 41. In automatic N/C mode, program translator routines 58 effect retrieval and processing of plural "blocks" of program instructions to determine operation associated with a particular block and permit continuous execution from block to block. In MDI mode, program translator routines 58 execute only single instruction blocks or limited sequences of instruction blocks and execution does not continue automatically to subsequent instruction blocks.

CNC 10 provides facilities for both conventional MDI wherein a user enters program codes and numeric data to define a desired cycle as well as MDI in accordance with the present invention wherein lead-through graphic displays facilitate operator selections and numeric data entry. This graphic assisted data input is distinguished from automated program generation programs such as SFP routines 47 in the nature of information required to be entered by the user. As it is the objective of SFP routines 47 to automate creation of N/C programs, data pertaining to the material, shape and dimensions of the workpiece to be processed is required and tool data must be associated with each machining operation. For MDI, the user inputs only so much data as is required for a desired cycle of operation. Further, SFP routines 47 are characterized in that a user program is produced in a two step process; processing of data input to generate a source program, and post processing of the source program to generate a user program conforming to the selected programming convention as adapted for a particular machine. Graphically assisted MDI of the present invention produces instruction blocks conforming to the applicable programming convention directly from manual data entry.

Graphic Assisted MDI

Main Graphic MDI Display

Figure 3:
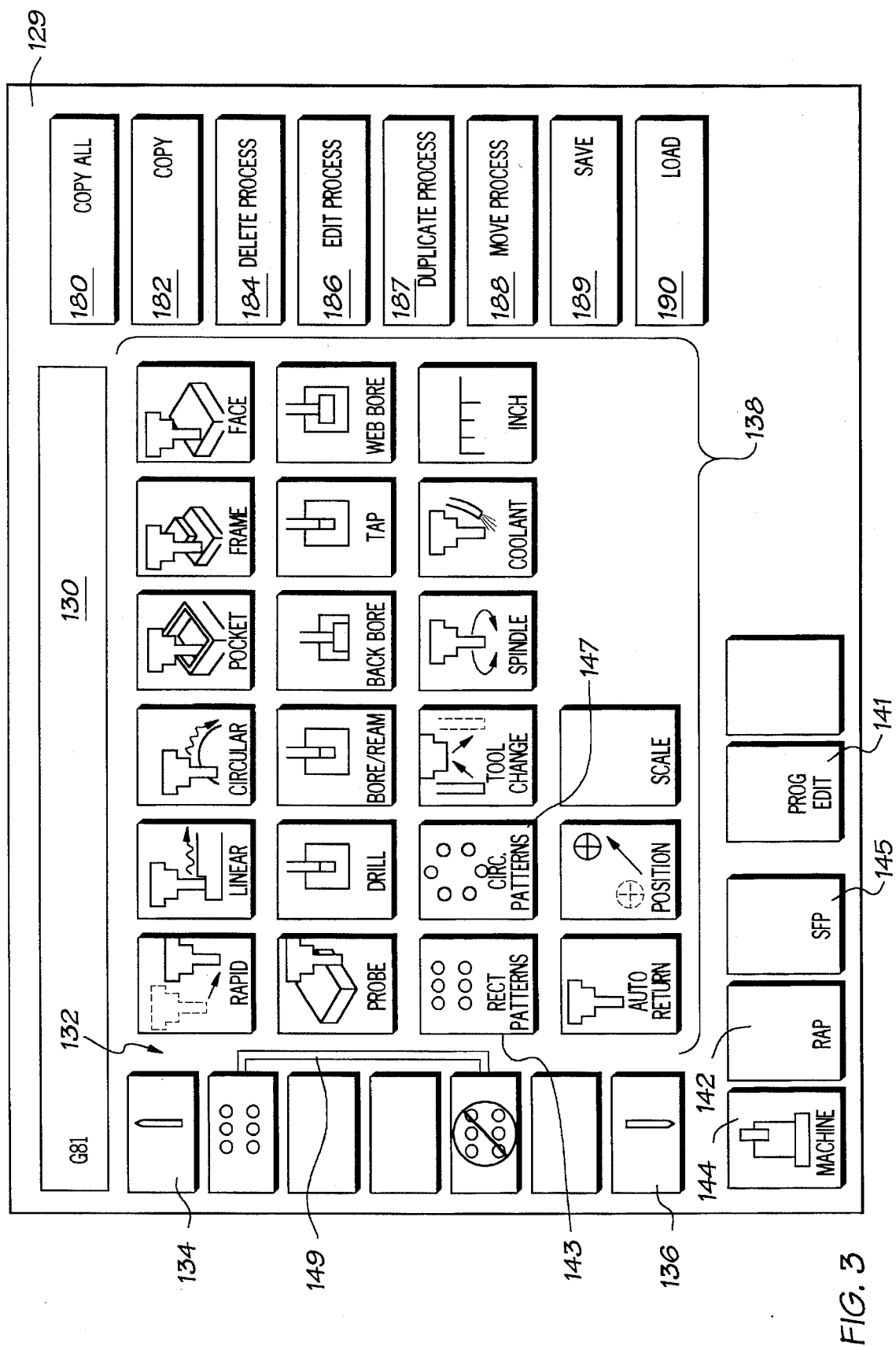
FIG. 3 illustrates a main graphical MDI display.

Graphic displays illustrative of displays in accordance with the present invention shall be described with reference to FIGS. 3 and 4. A main MDI display 129 from which MDI functions and alternative operating modes are selected is illustrated by FIG. 3. Display area 130 displays program code corresponding to function selections and numeric data entered in the MDI mode. Program codes displayed in area 130 comprise a "block" of instructions and data conforming to a programming convention. A display of a columnar list 132 has the appearance of five push buttons marked with icons of user selected cycles and functions, referred to as processes. The processes appear in the order of selection with the first selected at the top of the list. At the top of the column a push button 134 marked with an arrow is displayed, this display being used to effect scrolling of the displayed list toward the beginning of the list. At the bottom of the column is displayed a similar arrow marked push button 136 to effect scrolling of the displayed list toward the end of the list. A matrix of icon marked push button displays 138 enable selection of processes.

Continuing with reference to FIG. 3, a row of push button displays facilitates selection of control functions within the MDI mode and selection of other modes of operation of CNC 10. Push button display 144 is used to select a machining mode display which permits selection of alternative machining modes, i.e. automatic N/C mode initiating execution of automatic N/C control programs 46 and conventional MDI mode. Push button display 145 is used to select user program generation mode initiating execution of program generation control programs 47. Push button display 142 is used to select the graphic assisted MDI mode and is made to appear depressed when the graphic assisted MDI mode is active. Push button display 141 is used to select a user program edit mode which permits editing of user programs stored in program store 41.

Alternatives for storing processes and process lists are selected using the column of push button displays 180 through 190. Operation of push button display 189 saves the currently existing process list to process list store 39 for subsequent recall when using the graphic assisted MDI. A saved process list is recalled by use of push button display 190. A single selected process from the process list may be copied to random access memory 23 by use of push button display 182 for subsequent use in the user program edit mode. A complete process list may similarly be copied by use of push button display 180. Copied processes may be inserted into a user program being edited while in the user program edit mode. Push button display 188 is used to effect reordering of the sequence of the process list of columnar display 132. Operation of push button display 188 permits a selected process in the list to be moved within the list. Push button display 184 is used to delete a process previously added to the process list. Push button display 186 is used to enable editing of a process previously added to the process list. Push button display 187 is used to duplicate a selected process in the process list.

With main MDI display 129 presented on display 14, the user selects a process to be added or inserted to the process list by contacting touch screen 15 within the area of a push button display within the matrix of push buttons 138. Upon detection of contact and conversion of the contact location by touch screen interface 28, MDI control routines 44 effect an appearance change of the display of the associated push button. Shading and color is altered to give the appearance that the push button is being depressed. MDI control routines 44 then effect generation of a display for facilitating entry of data associated with the selected process. Numeric data is entered using keypad 18 and upon completion of entry of data associated with a selected process, the process may be added to or inserted into the process list. MDI control routines 44 verify that all data required to define a process has been entered. In the event further data entry is required to complete definition of the selected process, MDI control routines 44 prevent addition of the selected process to the process list. The user may either enter data required or cancel the selected process. Upon addition of a selected process to the process list or cancellation of a selected process, main MDI display 129 is again presented enabling selection of other processes or selection of another operating mode of CNC 10.

Graphic assisted MDI can be used with repetitive operation functions which perform plural machining functions defining a machining operation. For example, a hole pattern can be defined and drilling operations performed at locations specified by the hole pattern. To achieve this operation, a hole pattern defining function is selected by operation of a push button display 143 or 147. A lead-through graphic will then be displayed to permit entry of data defining locations of holes according to the hole pattern. Upon completion of entry of data associated with the selected pattern process, MDI control programs 44 cause a change in the appearance of the associated push button display to designate a pattern cancellation. The desired drilling processes are then selected from main MDI display 129 and data entered. Upon completion of selection and entry of data for all processes associated with the selected pattern, the pattern process push button display, now indicating pattern cancellation, is operated. A sequence of processes is thus created defining the operation(s) to be performed, the sequence beginning with the hole pattern process and ending with cancellation of the hole pattern process.

In process list display 132 the processes of a sequence are marked by a bar 149 bracketing the processes of the sequence. Upon operation of Cycle Start push button 98, each machining process included in the sequence will be performed at each location of the pattern. In the event plural machining processes are included in the sequence, the processes will be performed in the order of their occurrence in the sequence, each machining process being performed at all locations of the pattern before proceeding to the next machining process. In the creation of a sequence, MDI control programs 44 generate a program function code peculiar to the repetitive operation process which is recognized by the program translator routines 58. The instruction block produced by the MDI control programs 44 includes the program function code peculiar to the repetitive operation function as well as function codes for the machining operation processes. Besides the hole pattern processes, repetitive operation functions include pocket milling, frame milling and face milling processes selectable from MDI main display 129.

Lead-Through Graphic Display

Figure 4:
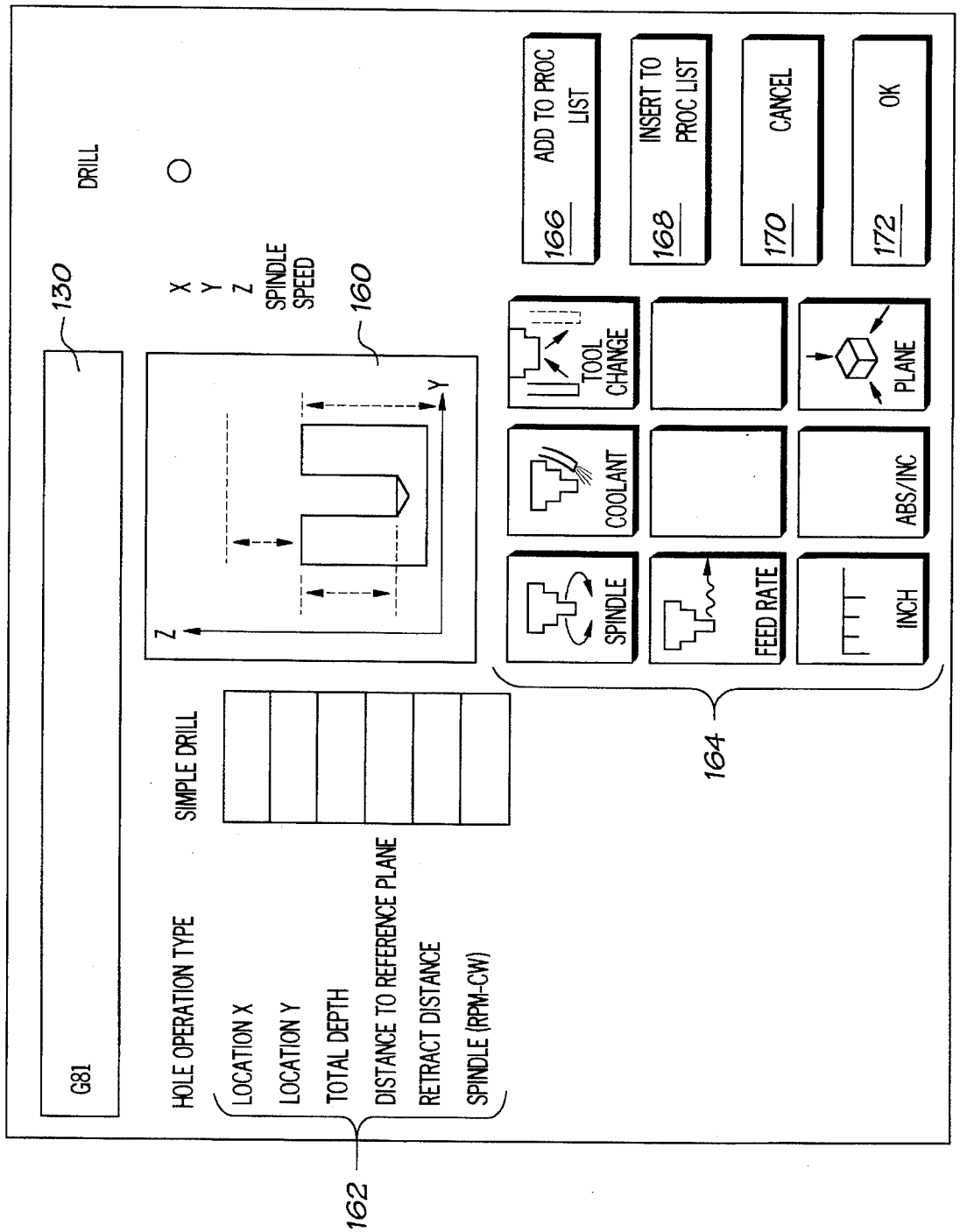
FIG. 4 is a display for entry of parameters associated with a function selected from the main graphical MDI display.

Data entry associated with a selected process shall be described with reference to FIG. 4, illustrating the data entry display associated with a selected drill cycle. Not all available selections of main MDI display 129 have associated graphic lead-through data entry displays. For example, selection of feedrate and coolant functions result in generation of data entry frames within that display. Likewise, not all functions displayed in a graphic lead-through data entry display have associated graphic lead through data entry displays.

Referring to FIG. 4, within display area 160, data entry lead-through graphics are presented which illustrate, qualitatively, dimensional data to be supplied. A single graphic may be associated with entry of plural data types as shown and different graphics may be presented for selected data types. In FIG. 4 a graphic is shown which is associated with data including: a coordinate defining location of a reference plane from which feedrate controlled motion is to be effected during the drill cycle; depth of the feedrate controlled motion; and a coordinate defining the location of a retract plane above the reference plane. A data list 162 is displayed together with the current value of each data type. The user selects a data type by cursor control using cursor control push buttons of push buttons 16 to move a visual highlight, for example, reverse video, though the data fields of all displayed data types until the data field of the desired data type is highlighted. A lead through graphic illustrating qualitatively the data type will be displayed in display area 160. The user then enters data from numeric keypad 18, the data appearing in the current data field adjacent the data type name. Program codes conforming to the applicable programming convention are displayed in display area 130 for each data type entered.

Together with the lead-through graphic display, icon marked push button displays 164 are generated to permit user selection of functions related to the selected process. For example, shown in FIG. 4 in association with the selected drilling operation are: a spindle control icon, enabling entry of spindle speed data and selection of direction of rotation; a coolant control icon, enabling Selection of coolant functions such as coolant "ON" or "OFF" and mist or flood coolant; a tool change icon enabling specification of a change of tool to be effected upon completion of the drill operation; a feedrate control icon enabling specification of a feedrate to be effective during the drilling operation; a dimension control icon enabling specification of the unit of measure to be effective during execution of the drilling operation; a position command mode control icon enabling selection of definition of coordinate data as absolute or incremental; and a plane selection control icon enabling specification of the plane into which the drilling operation is to be effected. As with the push button display of main MDI display 129, selections of any of the associated functions is effected by contacting touch screen 15 within the push button display area. MDI control routines will cause highlighting of the affected push button display to give the appearance that the push button is depressed and will generate the data entry display of the selected function. Once data have been entered for a selected process, the user may select addition of the process to the process list, insertion of the process in the process list or cancellation of the process using the push button displays 166, 168 and 170 respectively. Push button display 172 is used in connection with process editing. Having selected a process from the process list for editing, push button display 172 permits the user to accept data currently displayed, replacing data previously associated with the selected process.

Graphic MDI Example

An example of a procedure for graphic assisted MDI generation of a drill cycle data block for MDI execution shall be described with reference to FIG. 5. Instruction blocks generated by graphic assisted MDI correspond to instruction blocks of user programs created by other program generation techniques. Within a program, blocks are customarily delineated by an end-of-block character and controls typically execute instructions according to data preceding the end-of-block character. In MDI mode, the operation of Cycle Start serves to delineate instructions and data to be executed. Workstation operation accommodating the procedure of FIG. 5 is accomplished by execution of MDI control programs 44 by workstation processor 20.

Figure 5:
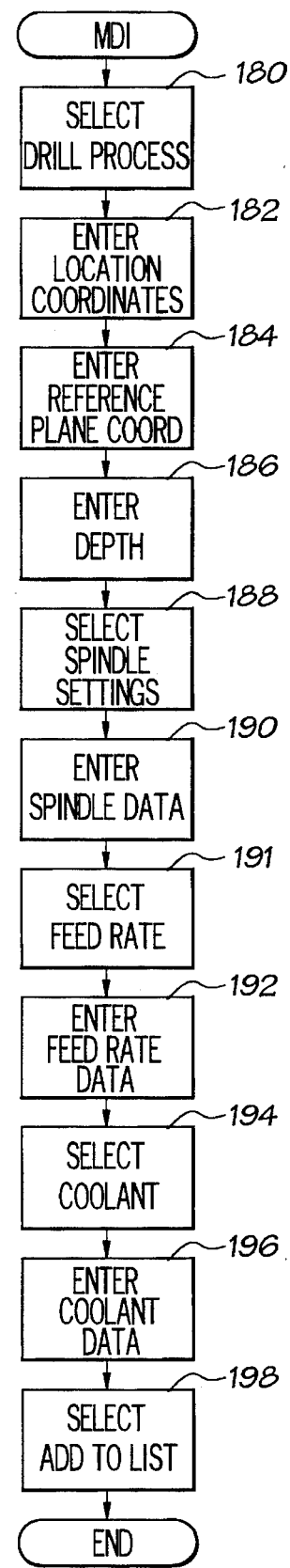
FIG. 5 is a flow chart of an MDI procedure according to the present invention.

Referring to FIG. 5, at procedure step 180 the drill process is selected by contacting touch screen 15 at the drill process icon marked push button display 139. Workstation processor 20 responds by effecting display of the lead-through graphic for the drill process. The data block display area is updated to display a G81 data word. At procedure step 182 numeric data is entered for the coordinates of the location at which drilling is to be performed. Data block display area 130 is updated to reflect the coordinates of the center of the hole to be drilled, for example, new coordinate data for the "X" and "Y" words. At procedure step 184 numeric data is entered for the reference plane coordinate and data block display area 130 is updated to show the program code ("R" word) defining the reference plane coordinate. At procedure step 186 data is entered specifying the depth of the hole to be drilled and data block display area 130 is updated to reflect the program code ("Z" word) defining the depth command.

A drilling operation requires feedrate and spindle control data addition to coordinate data. However, feedrate and spindle control data remain effective from an initial entry until canceled. If these data have not been entered previously, they may be input from the drill lead-through graphic by selection of associated functions. At procedure step 188 the spindle function is selected by contacting touch screen 15 at the SPINDLE icon marked push button display. Workstation processor 20 responds by effecting display of a lead-through data entry graphic for spindle control data. At procedure step 190 spindle data is entered specifying the desired direction and rate of rotation. Block data display area 130 is updated to reflect instruction code associated with the selected spindle control data, for example, data for defining the spindle rotation direction associated with an "M" word and spindle speed data associated with an "S" word. At procedure step 191 a feedrate control function is selected by making contact with touch screen 15 at the FEEDRATE icon marked push button display. Workstation processor 20 responds by effecting display of a data entry frame for feedrate within the drill cycle data entry graphic display. At procedure step 192 feedrate data is entered and the data block display area is updated with new feedrate data, associated with, for example, an "F" word.

Provided coordinate, feedrate, and spindle speed data have been specified, the drilling operation may be executed. However, additional data associated with a drilling operation may also be entered, such as, for example, coolant control data. At procedure step 194 the coolant control function is selected by making contact with touch screen 15 at the COOLANT icon marked push button displays. Workstation processor 20 responds by effecting display of a coolant data entry frame within drill cycle data entry graphic. At procedure step 196 coolant data is entered to select coolant "ON" and the desired type of coolant, i.e. "FLOOD" or "MIST". Block display area 130 is updated to reflect the instruction code associated with the selected coolant control data.

In preparation for execution of the drill instruction block, at procedure step 198 the drill function is added to the process list by making contact with touch screen 15 at the ADD TO PROCESS LIST marked push button display. Following addition of the process to the process list, the drill cycle will be executed following the cycle of operation described with reference to FIG. 2 in response to operation of Cycle Start push button 98.

While the invention is illustrated with reference to the preferred embodiment and while the preferred embodiment has been described in considerable detail, it is not the intention of applicants that the scope of the invention be so limited. Rather it is intended that the scope of the invention shall be defined by the appended claims and all equivalents thereof.

What is claimed is:

1. Apparatus comprising:
   a) numeric keyboard means for entry of numeric data;
   b) selection and display means for:
      i) displaying and manually selecting graphic icons associated with plural machining operations;
      ii) displaying lead-through graphic images associated with selected machining operations wherein functions associated with selected machining operations are displayed;

c) means for enabling manual entry of numeric data associated with selected machining operations during display of leads-through graphic images;

d) means for translating operation selections, function selections and numeric data into codes to produce an instruction block conforming to a predetermined programming convention;

e) means for executing the instruction block so produced to control operation of machine actuators.

2. The apparatus of claim 1 further comprising storage means for storing instruction blocks created by the translating means for subsequent recall.

3. The apparatus of claim 1 further comprising means for copying instruction blocks created by the translating means into a stored program.

4. The apparatus of claim 1 wherein the selection and display means further comprises means for defining a sequence of operations requiring the repetitive performance of selected functions.

5. The apparatus of claim 4 wherein the sequence of operations includes a pattern of holes to be machined.

6. The apparatus of claim 1 wherein the selection and display means further comprises a contact actuated touch screen.

7. The apparatus of claim 1 wherein a lead-through graphic image is associated with plural data types to be entered and plural lead-through graphic images are displayed according to the data types to be entered.

8. The apparatus of claim 1 wherein the selection and display means displays instruction code and data according to the operator selections and data entries and conforming to the predetermined programming convention.

9. The apparatus of claim 1 wherein the selection and display means displays a list of operator selections.

10. The apparatus of claim 9 wherein the selection and display means further comprises means for selecting a selection displayed in the list to be edited.

11. The apparatus of claim 9 wherein the selection and display means further comprises means for altering the order of selections appearing in the list.

12. A method for manual data entry operation of a machine control comprising the steps of:

a) displaying a plurality of selectable processes, each process being associated with program code conforming to a predetermined programming convention;

b) displaying a lead-through graphic display permitting entry of data associated with a process selected from the plurality of selectable processes, the lead-through graphic display illustrating, qualitatively, at least one data type to be entered;

c) adding the process for which data entry has been completed to a list of selected processes in response to a manual input directing that the process be added to the list; and d) executing the program code of a selected process included in the list in response to a manually operated cycle start input.

13. The method of claim 12 wherein the list of selected processes is displayed.

14. The method of claim 13 wherein a process is selected from the displayed list and the lead-through graphic display is displayed permitting editing of data associated with the selected process.

15. The method of claim 13 wherein a repetitive operation process is selected and the display of the list includes a display marking the processes defining the repetitive operation process.

16. The method of claim 13 further comprising the steps of changing the order of processes displayed in the list in response to a manual input directing that a process be moved within the list.

17. The method of claim 12 further comprising the step of saving the list of selected processes in a list store in response to manual input directing that the list be saved.

18. The method of claim 17 further comprising the step of recalling a list of selected processes from the list store in response to a manual input directing that the list be recalled.

19. The method of claim 12 wherein a process selected from the list is copied to a program store in response to manual input directing that a process be so copied.

20. The method of claim 12 wherein the process list is copied to a program store in response to manual input directing that the process list be so copied.

* * * * *